Oct. 23, 1928. Re. 17,111

W. A. NOURIE

BELT CONNECTER

Original Filed April 16, 1924

INVENTOR,
Wendell A. Nourie.
BY Sterling P. Buck,
ATTORNEY.

Reissued Oct. 23, 1928.

Re. 17,111

UNITED STATES PATENT OFFICE.

WENDELL A. NOURIE, OF KANKAKEE, ILLINOIS.

BELT CONNECTER.

Original No. 1,527,063, dated February 17, 1925, Serial No. 706,971, filed April 16, 1924. Application for reissue filed February 9, 1927. Serial No. 167,019.

This invention relates to a belt connecter designed for connecting together the ends of a round belt, the general object of the invention being to provide a pair of bars, each having its ends sharpened and adapted to be passed through and secured in the belt end, portions of the bars being adapted to be bent to form loops or eyes for inter-linking with each other.

This invention also consists in certain other features of construction and in the combination and arrangement of the several parts, to be hereinafter fully described, illustrated in the accompanying drawings, and specifically pointed out in the appended claim.

In describing my invention in detail, reference will be had to the accompanying drawings wherein like characters denote like or corresponding parts throughout the several views, and in which:—

Figure 1:
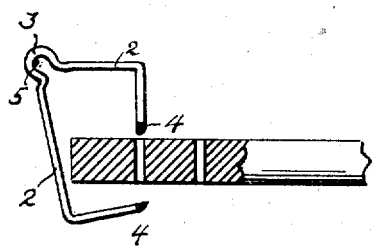
Figure 2:
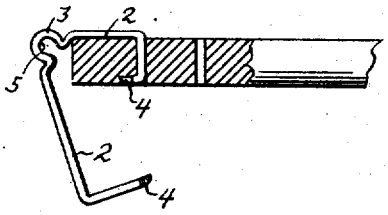
Figure 3:
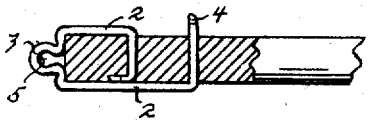
Figure 4:
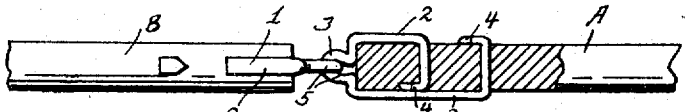
Figure 5:
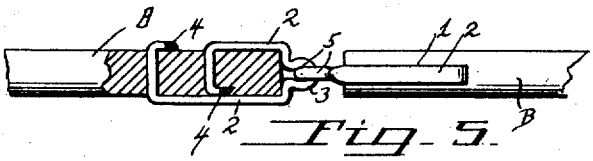

Fig. 1 is a view illustrating one of the connecters in position to be engaged with a punctured end of a belt. Fig. 2 is a view showing the same connecter and belt-end as shown in Fig. 1, but the connecter having one arm inserted and clinched. Fig. 3 is a view of the same parts shown in Figures 1 and 2, but both arms of the connecter extending through the belt-end, the long arm ready to be clinched. Fig. 4 is a view showing the two inter-linked belt connecters clinched through adjacent belt-ends. Fig. 5 is a view similar to Fig. 4, but viewed at a different angle, and a different belt-end being in section.

In these drawings, A and B are the ends of the belting to be connected together and 1 indicates the connecting device attached to each belt end. Each device is formed from a strip of metal which has its end portions 2 of flat formation and its intermediate portion 3 of round formation. One of the flat portions is shorter than the other portion and the extremities are sharpened, as shown at 4, so that they can pass through the belting. The inner sides of the parts 2 are plane throughout their length, while the outer sides and edges converge to an apex or relatively sharp point, and this construction not only serves to properly guide the ends through punctures previously made through the belt, but also helps to turn the ends inward, while clinching them, towards the loop or bight 5. The round portion is looped to form an eye 5 which is adapted to engage the eye on the other member as shown in Figures 1 and 2 and the flat portions extend parallel for a distance and engage opposite sides of the belting, and the said flat portions are bent at right angles and driven through the belt and their extremities, and bent again at right angles to engage the sides of the belt. As one flat portion is shorter than the other the portions will pass through the belt at different points, as shown in Figures 1 and 2 and the extremity of the short portion will lie under the long portion when the device is in position.

It will thus be seen that I have provided simple means for connecting together the ends of a belt, and in which the penetrating members are spaced apart so that the belt is not weakened.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A belt connecter comprising a pair of members each composed of a bar or the like which is substantially flat throughout the greater part of its length and includes sharp end portions, this bar having a loop formed of a portion which is round in cross section and disposed at a greater distance from one end than the other so that one of said end portions extends beyond the other, each of such end portions being bent at an angle in such relation that the ends can be passed into opposite sides of the belt at different points along the belt, said end portions being bendable for clinching against the belt, substantially as shown, each of said members being formed with a bent portion at opposite sides of the opening of the loop, so the said opening will be restricted when the belt connecter is closed and clinched against the belt, substantially as shown.

WENDELL A. NOURIE.